United States Patent [19]

Yang et al.

[11] Patent Number: 5,784,416
[45] Date of Patent: Jul. 21, 1998

[54] METHOD AND APPARATUS FOR DETECTION OF A COMMUNICATION SIGNAL

[75] Inventors: Gordon Guowen Yang, Richmond; William Chee-Foon Chong, Surrey, both of Canada

[73] Assignee: Motorola, Inc., Schaumburg, Ill.

[21] Appl. No.: 537,201

[22] Filed: Sep. 29, 1995

[51] Int. Cl.⁶ .............................. H04L 27/06; H04L 27/14
[52] U.S. Cl. ........................................ 375/341; 375/336
[58] Field of Search ................................ 375/202, 341, 375/316, 355, 43, 224, 336, 360, 226; 329/315, 300

[56] References Cited

U.S. PATENT DOCUMENTS

| | | | |
|---|---|---|---|
| 4,599,732 | 7/1986 | LeFever | 375/231 |
| 4,745,625 | 5/1988 | Eyuboglu | 375/316 |
| 5,001,724 | 3/1991 | Brigenbeier et al. | 375/226 |
| 5,384,560 | 1/1995 | Yamasaki | 327/60 |

*Primary Examiner*—Tesfaldet Bocure
*Attorney, Agent, or Firm*—Pedro P. Hernandez

[57] ABSTRACT

The disclosed communication unit functions to detect a signal by detecting the zero crossing of a current sample (and prior samples) and determining a sample value for each sample, and to determine an estimated bit value of a previous sample based on upper and lower node metrics. In the preferred embodiment a two-state decoder is used. Using prior sample values, the possible upper and lower node path distance metrics are first determined, then path difference metrics are determined for each node based on the path distance metrics. The difference metrics are then compared against a threshold, preferably zero, to determine the estimated bit value (or which surviving path to use) in decoding a prior sample.

8 Claims, 3 Drawing Sheets

ZERO-CROSSING

EYE DIAGRAM OF GMSK (BT=0.36)

TWO-LEVEL DECISION DETECTION

TRELLIS DIAGRAM OF GMSK

SURVIVOR PATHS

METHOD AND APPARATUS FOR DETECTION OF A COMMUNICATION SIGNAL

FIELD OF THE INVENTION

The present invention relates to communications and more particularly an improved method and apparatus for detection of a signal by a communications unit.

BACKGROUND

A key concern in all communications systems, but particularly wireless communications systems, is the development of a spectrally and energy efficient protocol that is still robust against noise and other interference. A well known example of one such protocol is that of the GSM (Global System for Mobiles) cellular radiotelephone specification. In order to optimize its system, e.g., by providing a compromise between a fairly high spectral efficiency in exchange for a fairly reasonable computational complexity, a GMSK (Gaussian Minimum Shift Keying) modulation scheme was adopted for GSM and other wireless systems like the RAM mobile data network.

In choosing an appropriate receiver structure for a given protocol, such as protocols using GMSK, there are additional trade-offs based on factors such as the performance needed for a given environment. Thus, for example, in GMSK systems there are generally three possible detection schemes: coherent detection, differential detection, and discriminator detection. While coherent detection yields good static BER (bit error rate) performance, reference carrier recovery can become difficult in fast fading environments such as found in mobile radio communications. Differential detection is superior to coherent detection with regard to quickness in reference carrier recovery; however, its static BER performance is inferior due to increased intersysmbol interference effects. Thus, because discriminator detection tends to offer better immunity against fast fading and center frequency drift, it is particularly useful for mobile radio applications.

However, discriminator detection also suffers from degradation in static BER performance because of intersysmbol interference. For example, in one approach to discriminator detection, the discriminator output, after low-pass filtering, is sampled once every bit period. The samples are then compared to a preset threshold, usually zero volts, and a decision is made either that a '1' was received if the samples exceed the threshold, or that a '0' was received. The "eye" opening of a GMSK signal with a BT parameter of 0.36, such as is illustrated by FIG. 1, is significantly reduced by intersymbol interference effects. This intersymbol interference is caused, e.g., by baseband band limitations with the Gaussian low-pass filter. For GMSK, the worst patterns, leaving the least noise margin at the decision point (i.e., smallest eye openings), are '010' or '101'.

Unfortunately, the BER performance of detection significantly degrades with the smaller eye openings, such as found in schemes like GMSK. Further, while additional detection approaches have been proposed, any increase in dynamic BER is limited in many newer rf (radio frequency) devices. Because of the increasingly smaller sizes demanded (e.g., for rf modems), receiver sensitivity may be significantly reduced due to the limited circuit spacing, leading to a similar reduction in the dynamic BER.

A need therefore remains for an improved detector providing improved signal detection/quality which solves these and other problems.

BRIEF DESCRIPTION OF THE DRAWINGS

These problems and others are solved by the improved method and apparatus according to the invention, of which one illustrative embodiment is described below in connection with the following drawings.

DETAILED DESCRIPTION

One illustrative embodiment of the invention, presently preferred in connection with use in systems using GMSK, is a communication unit functioning to detect a signal by detecting the zero crossing of a current sample and determining a current sample value, and determining the most likely state based on upper and lower node metrics. In the preferred embodiment a two state decoder is used. Using the current sample value, the possible upper and lower node MLSE path distance metrics are first determined, then a MLSE node path difference metric is determined for each node based on the path metrics. The difference metrics are then compared against a threshold, preferably zero, to determine which surviving path to use in decoding. By using such a maximum likelihood sequence estimation approach, a significant increase in noise immunity (i.e., decrease in BER) is achieved, at the expense of only a moderate increase in computational complexity.

Figure 1:
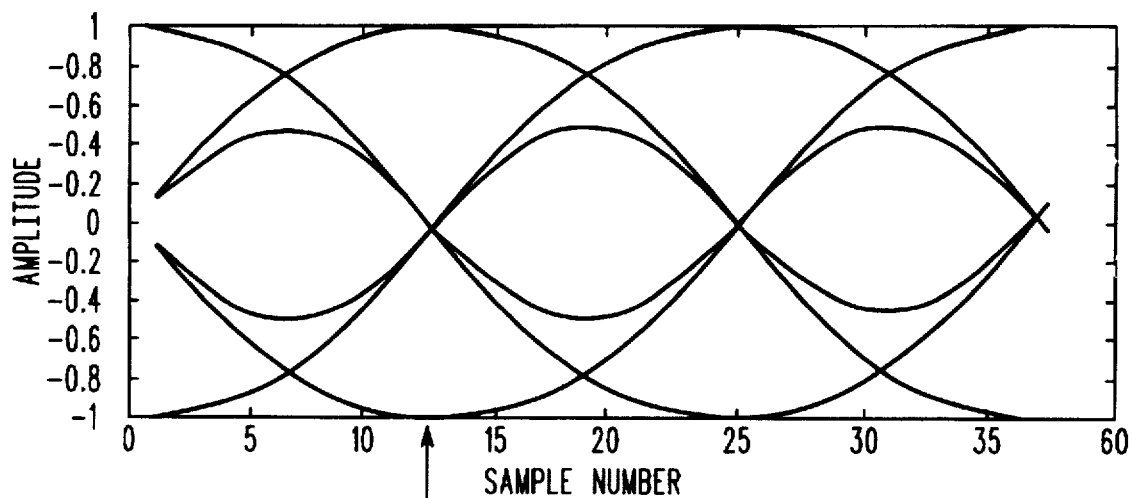
FIG. 1 is an eye diagram of a GMSK signal such as may be used in connection with the embodiment of the invention described below.
Figure 2:
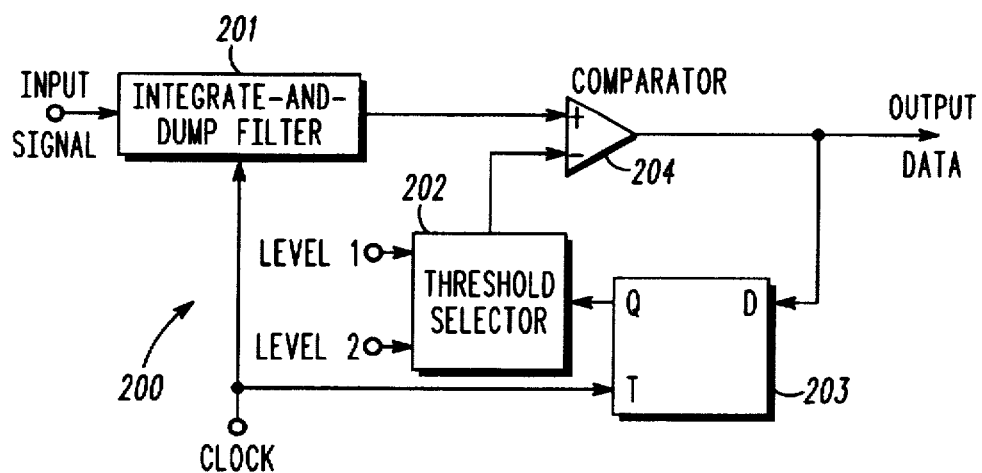
FIG. 2 is a block diagram of a possible multi-level detection circuit for a GMSK signal.

Beginning first with FIG. 2, one possible alternative to the discriminator detection circuit described above is multilevel decision detection circuit, similarly capable of use with a GMSK signal. The input to the two-level decision detector 200 is a GMSK baseband signal from the discriminator (not shown). An integrate-and-dump filter 201 is used to enhance the Signal to Noise Ratio (SNR) at the decision points. The threshold level selector 202/flip flop 203 function by selecting Level 1 if the previous bit is '1'; otherwise selecting Level 2. If the previous bit is '1', the current decision is made (via comparator 204) as follows:

$$\text{Output} = \begin{cases} 1 & \text{if integrate-and-dump output} > \text{Level1} \\ 0 & \text{if integrate-and-dump output} \leq \text{Level1} \end{cases}$$

Similarly, If the previous bit is '0', the current decision is made:

$$\text{Output} = \begin{cases} 1 & \text{if integrate-and-dump output} > \text{Level2} \\ 0 & \text{if integrate-and-dump output} \leq \text{Level2} \end{cases}$$

But, while such a multilevel decision detection can offer significant BER performance improvement in a static channel over the discriminator detection described earlier, its dynamic BER performance is much less robust. In smaller circuits, where sensitivity is compromised by the limited circuit spacing, a significant reduction in the dynamic BER may result.

Figure 3:
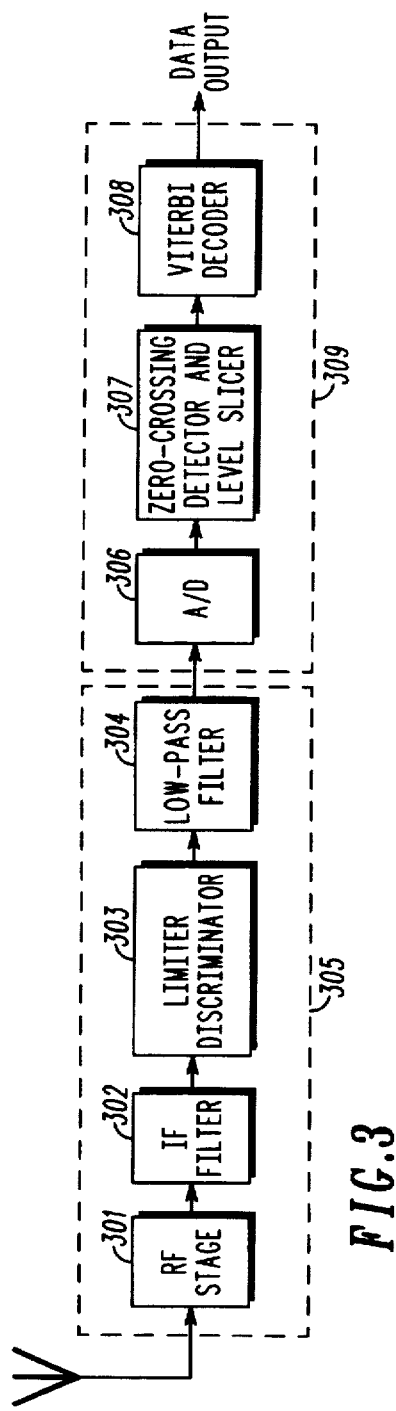
FIG. 3 is a block diagram of a receiver according to the embodiment of the invention described below.

FIG. 3 shows a block diagram of a receiver according to a presently preferred embodiment of the invention for GMSK. The received rf GMSK signal is first down converted to an IF (intermediate frequency) signal via rf front end stage 301. Prior to the limiter-discriminator 303, the IF signal is applied to an IF filter 302 to limit the receiver noise and to reduce the levels of adjacent channel interference; rf stage 301, IF filter 302 and discriminator 303 together form a demodulator stage 305 for the receiver. The discriminator 303 output is the received baseband GMSK signal corrupted by noise and distorted by the IF filter. The output of the discriminator 303 is low pass filtered via LPF (low pass filter) 304 to further bandlimit the input signal and reduce the noise level. The output of LPF 304 is fed to the data detector 309. The output of the data detector 309 is a replica of the transmitted data. The data detector 309 consists of an A/D converter 306, a timing recovery detector (e.g., a zero-crossing detector) and level slicer 307 and a maximum likelihood sequence estimation (MLSE) detector 308 or Viterbi decoder. The A/D converter 306 functions to sample and quantize the analog signal into a digital signal. The zero-crossing detector 307 functions to adjust the sample point to the zero-crossing point. The function of the decoder 308 is to make the data detection decision.

A skilled artisan will appreciate that the MLSE detector 308 can be used to improve error performance over prior art bit-by-bit detection schemes for a Gaussian noise environment when there is a dependence between the sequence of digital information samples. In the case of GMSK signals, the premodulation inherently introduces intersymbol interference (ISI) or dependence between adjacent bits.

For detection of the GMSK signal, the decision instant is preferably at the zero-crossing points, which are offset from the bit center by T/2, where T is the bit duration. The signal amplitude at the ith sampling instant for a GMSK signal is then given by $$r_i = \ldots + b_{i-2}g(3T/2) + b_{i-1}g(T/2)_{i+1}g(-3T/2) + \ldots \quad \text{Eq.1}$$

where $b_i = \pm 1$ (the original data value), and g(T) is the GMSK impulse response. From Eq. 1, the intersymbol interference at the sampling instant is the amplitudes of the impulse response at instants of time $t = \pm(2n+1)T/2$, where n is an integer. If the influence of g(t) for $t \geq |3T/2|$ is assumed to be de minimis, then Eq. 1 is simplified to the form $$r_i = d_{i-1} + d_i \quad \text{Eq.2}$$

where $d_i$ (the received data at a sample point i) $= b_i A = \pm A$ and $A = g(T/2) = g(-T/2)$.

The GMSK signal ri represented by Eq. 2 depends on knowledge of the past and present data; this correlative property can be exploited to improve the BER performance of signal detection. To minimize the probability of detecting known signal $s_i$ incorrectly in the presence of AWGN (additive white Gaussian noise), it is necessary to maximize the natural log-likelihood function $$\ln(l(x_i)) = \frac{2}{\sigma^2} \sum_{i=0}^{\infty} \left( \frac{x_i s_i}{2} - \frac{s_i^2}{4} \right) \quad \text{Eq. 3}$$

where xi $= s_i + n_i$ is the ith received sample value of known signal $s_i$ in the presence of Gaussian noise $n_i$ with variance $\sigma$.

When $s_i$ is replaced by $r_i$ of Eq. 2 for the GMSK signal, Eq. 3 becomes $$\ln(l(x_i)) = \frac{2}{\sigma^2} \sum_{i=0}^{n} \left[ \frac{x_i(d_{i-1}+d_i)}{2} - \frac{(d_{i-1}+d_i)^2}{4} \right] + \quad \text{Eq. 4}$$

$$\frac{2}{\sigma^2} \sum_{i=n+1}^{\infty} \left[ \frac{x_i(d_{i-1}+d_i)}{2} - \frac{(d_{i-1}+d_i)^2}{4} \right]$$

Figure 4:
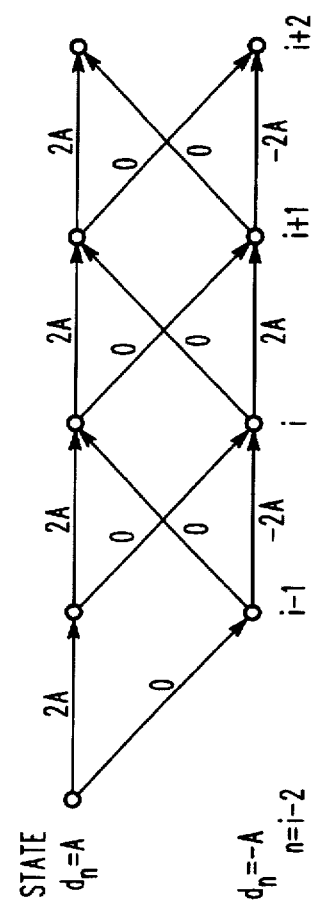
FIG. 4 is a trellis diagram illustrative of possible decision paths for a two-state decision circuit used in the described embodiment.

The signal trellis representation of Eq. 4 is shown in FIG. 4, where the value within each node symbol 'o' corresponds to the contribution of that branch of the signal path to the summation. The preferred procedure for maximizing Eq. 4 is to select the path, leading to a particular node n, which contributes the maximum value to the summation. Now, the best (most likely) path leading to upper node state $d_n = A$ may be defined by the upper node path metric $P_n$ where $$P_n = \text{Max}_{d_n = A} \left\{ \sum_{i=0}^{n} \left[ \frac{x_i(d_{i-1}+d_i)}{2} - \frac{(d_{i-1}+d_i)^2}{4} \right] \right\} \quad \text{Eq. 5}$$

Similarly, the best path leading to lower node state $d_n = -A$ may be defined by a lower node path metric $N_n$ where $$N_n = \text{Max}_{d_n = -A} \left\{ \sum_{i=0}^{n} \left[ \frac{x_i(d_{i-1}+d_i)}{2} - \frac{(d_{i-1}+d_i)^2}{4} \right] \right\} \quad \text{Eq. 6}$$

At any particular instant, there are four possible paths leading from node(s) i=n to node(s) i=n+1. With the MLSE decoding, only the most probable or highest metric path leading into each of the two states is retained. From FIG. 4 and Eqs. 5 and 6, it is evident that the most likely path leading to upper node state $d_n+1 = A$ is given by the condition $$P_{n+1} = \text{Max} \begin{cases} P_n + x_{n+1} - A & \text{from } dn = A \\ N_n & \text{from } dn = -A \end{cases} \quad \text{Eq. 7}$$

Now, an upper node path difference metric U may be defined as the difference between the two metrics in Eq. 7 such that $$U = P_n - N_n + X_{n+1} - A \quad \text{Eq.8}$$

Similarly, the most probable path leading to lower node state $d_{n+1} = -A$ is given by $$N_{n+1} = \text{Max} \begin{cases} P_n & \text{from } dn = A \\ N_n - x_{n+1} - A & \text{from } dn = -A \end{cases} \quad \text{Eq. 9}$$

Likewise, a lower node path difference metric V may be defined as the difference between the two lower node path metrics in Eq. 9 such that $$V = P_n - N_n + X_{n+1} + A$$

Figure 5:
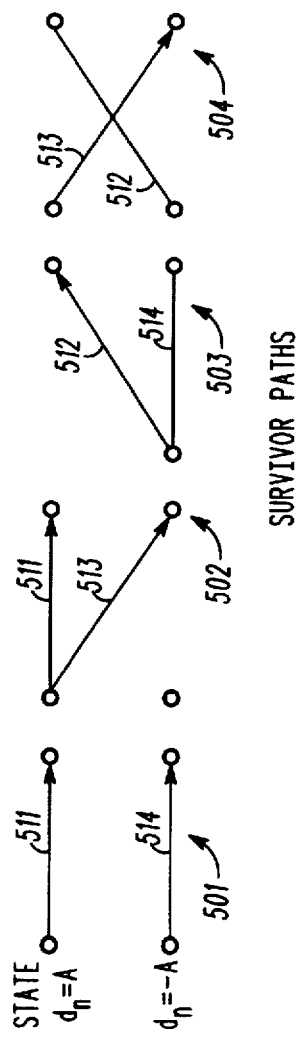
FIG. 5 is a diagram showing survivor paths possible for a two-state decision circuit such as that of the described embodiment.

The variables U and V may then be advantageously used to control the updating of the path histories and metrics for the MLSE detector. With Viterbi decoding of a two-state code such as in the preferred approach, at any instant there are two survivor paths for each node, one ending at state $d_n = A$ and another at state $d_n = -A$. The four resultant state change possibilities 501–504 are shown in FIG. 5. Using Eqs. 7 through 10, the correspondence of the paths 511–514 in FIG. 5 to the transitions and metrics in Eqs. 7 and 9 may be understood as follows:

First, if $U \geq 0$ (or path 511 has a larger metric than path 512), then it follows from Eqs. 7 and 9 that $V \geq 0$ (or path 513 has a larger metric than path 514). Thus the illustrated state change 501 is actually an impossible case, so the transition 502 must instead occur. Then, $P_{n+1} = P_n + X_{n+1} - A$, and $N_{n+1}=P_n$. A merge has occurred and the path up to t=nT is uniquely determined independent of the succeeding observations.

Second, if V<0 then path 514 to state $d_n=-A$ is chosen. Consequently, it follows that U<0 and the path to state $d_n=A$ with the largest metric is 512, as illustrated by state change 502. Then $P_{n+1}=N_n$ and $N_{n+1}=N_n-X_{n+1}-A$. Again, a merge has occurred, and the path up to t=nT is uniquely determined.

Last, if neither U>0 nor V<0, then the best paths at t=(n+1)T come from different states, as shown in state change 504. In this case, $P_{n+1}=N_n$ and $N_{n+1}=P_n$.

Therefore, the most likely estimation of a transmitted bit is $$dn = \begin{cases} A \text{ If } U = P_n + x_{n+1} - A \geq 0 \\ -A \text{ If } V = P_n + x_{n+1} + A < 0 \\ \text{No Decision if } U < 0 \text{ and } V \geq 0 \end{cases} \quad \text{Eq. 11}$$

Figure 6:
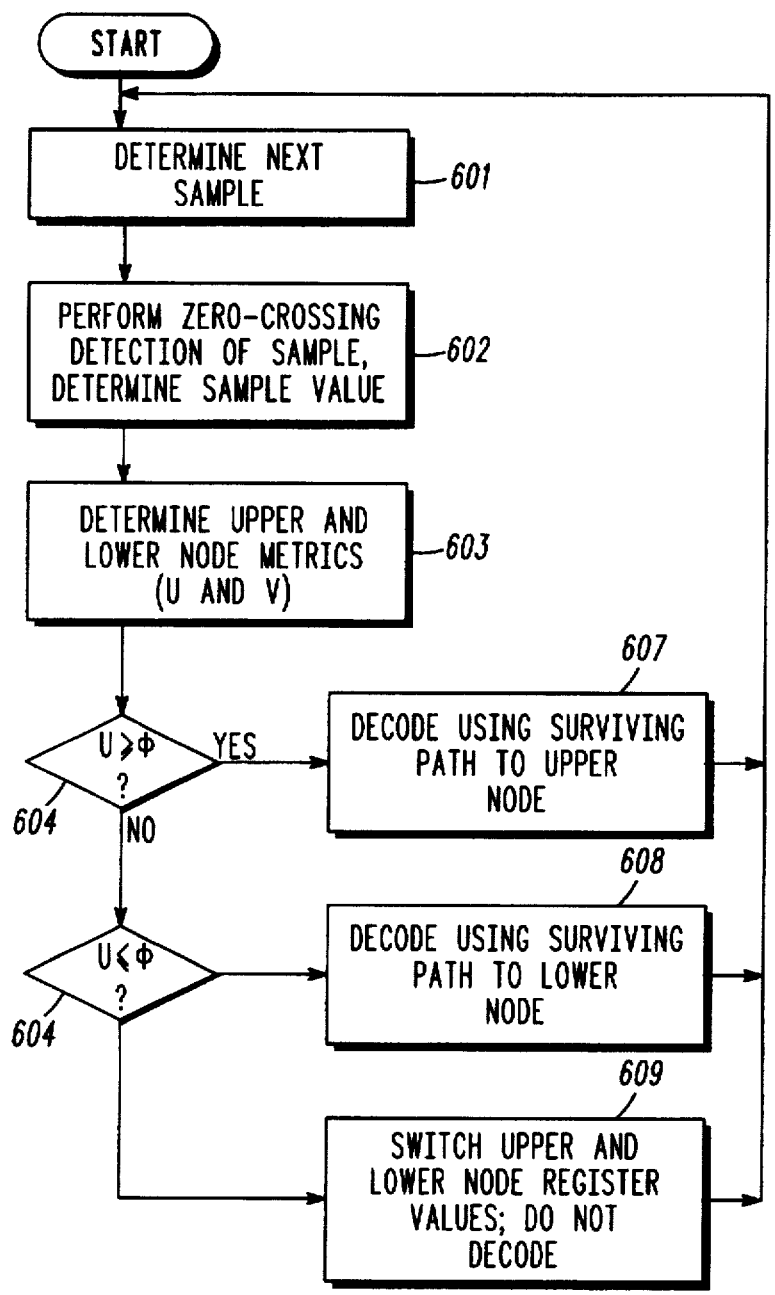
FIG. 6 is a flow chart illustrating presently preferred steps used in signal detection with the receiver of FIG. 3.

Note that if U<0 and V≥0, no decision is made at the current interval. In this case, a decision will be made when either U≥0 or V<0 at later intervals A preferred process for implementing the above embodiment is illustrated in FIG. 6. The path histories to state $d_n=A$ and state $d_n=-A$ are stored, preferably in registers or buffers. A zero-crossing on the next sample is performed, and the variables U and V are calculated as per Eqs. 8 and 10 (steps 601–603). If U≥0, then the signal is decoded using the surviving path to the upper node (i.e., case 502), and if V<0 then the signal is decoded using the surviving path to the lower node (i.e., case 503) (steps 605–608). If neither U≥0 nor V<0, then the states are swapped (case 504) and the signal is not decoded (step 609). As one skilled in the art will appreciate, this process is specially suitable for a DSP (digital signal processor) implementation because DSPs are efficient for data multiply-and-accumulate operations; however, any suitable digital processor (e.g., a microprocessor or ASIC (application specific integrated circuit)) may also be used. From the trellis diagram shown in FIG. 4, one can see that the constraint length of such a GMSK encoded signal is 2. It is recognized in the art that a decoding depth of 5 times the constraint length yields almost the optimal decoding performance. Thus, for the MLSE decode process illustrated in FIG. 6, one need only use two registers with more than 10 bits. Therefore, if this process is implemented on, e.g., a 16-bit DSP, there no performance degradation should be seen. Also, a skilled artisan should recognize that a potential for equi-probable metrics converging at each level of the trellis exists, leaving equal probability of a correct or incorrect choice. In order to avoid this situation, an appropriately chosen tie-point is desireable in order to anchor the trace-back through the trellis, which tie-point is a matter of design choice for the skilled artisan.

While the invention has been described in conjunction with specific embodiments thereof, it is evident that many alterations, modifications, and variations will be apparent to those skilled in the art in light of the foregoing description. For example, while processor 214 and other circuits, are described in terms of specific logical/functional circuitry relationships, one skilled in the art will appreciate that such may be implemented in a variety of ways, including components or other circuitry in lieu of appropriately configured and programmed processors, ASICs or DSPs. Further, the invention is not limited to the illustrated data or cellular systems and block structure, but has applicability to any communications receiver, whether infrastructure, subscriber or other, requiring decoding. Thus, it should be understood that the invention is not limited by the foregoing description of preferred embodiments, but embraces all such alterations, modifications, and variations in accordance with the spirit and scope of the appended claims.

We claim:

1. A receiver comprising:

a demodulator operable for demodulating a received signal; and a data detector, coupled to the demodulator, comprising:

a sampler and timing recovery detector means for sampling the signal and outputting a current sample amplitude value for a current sample; and a decoder means for estimating a bit value of a prior sample to the current sample based on a sequence estimation of the first sample value by determining path distance metrics based on the first sample value and preceding sample values, determining path difference metrics based on the path distance metrics for each node, and decoding the prior sample based on the node difference metrics, wherein the decoder means is operable for determining the path distance metrics by determining:

(a) an upper node path distance metric $P_n$ based on measured amplitudes $x_0$ through $x_n$ for a number n (where n is an integer representing a number of samples from a most recently decoded sample to the current sample) most recent samples preceding the current sample and estimated bit values $d_0$ through $d_n$ for the previous n samples, such that $$P_n = \text{Max}_{d_n=A} \left\{ \sum_{i=0}^{n} \left[ \frac{x_i(d_{i-1}+d_i)}{2} - \frac{(d_{i-1}+d_i)^2}{4} \right] \right\} ; \text{and}$$

(b) a lower node path distance metric $N_n$ based on measured amplitudes $x_0$ through $x_n$ for a number n (where n is an integer representing a number of samples from a most recently decoded sample preceding the current sample) most recent samples preceding the current sample and estimated bit values $d_o$ through $d_n$ for the previous n samples, such that $$N_n = \text{Max}_{d_n=-A} \left\{ \sum_{i=0}^{n} \left[ \frac{x_i(d_{i-1}+d_i)}{2} - \frac{(d_{i-1}+d_i)^2}{4} \right] \right\}.$$

2. The receiver of claim 1 wherein the decoder means is operable for determining the path difference metrics by determining:

(c) an upper node path difference metric $U_n$ based on the upper node path distance metric $P_n$, the lower node path distance metric $N_n$, the current sample value (where the first sample value is $x_{n+1}$), and a predetermined state amplitude value A, such that $U_n=P_n-N_n+X_{n+1}-A$; and (d) an lower node path difference metric $V_n$ based on the upper node path distance metric $P_n$, the lower node path distance metric $N_n$, the current sample value $X_{n+1}$, and the predetermined state amplitude value A, such that $V_n=P_n-N_n+X_{n+1}+A$.

3. The receiver of claim 2 wherein the decoder means is operable for decoding the prior sample as estimated bit value $d_n$ where: (a) $d_n=A$ when $U_n \geq 0$; and (b) $d_n=-A$ when $V_n<0$.

4. A method of receiving a signal by a receiver comprising:

demodulating a received signal by a demodulator; and sampling the signal by a sampler and timing recovery detector and outputting a current sample amplitude value for a current sample; and estimating a bit value of a prior sample to the current sample based on a sequence estimation of the first sample value by determining path distance metrics based on the first sample value and preceding sample values, determining path difference metrics based on the path distance metrics for each node, and decoding the prior sample based on the node difference metrics, wherein the step of estimating is performed in a two-state MLSE (maximum likelihood sequence estimation) detector, and further comprises determining the path distance metrics by determining:

(a) an upper node path distance metric $P_n$ based on measured amplitudes $x_0$ through $x_n$ for a number n (where n is an integer representing a number of samples from a most recently decoded sample to the current sample) most recent samples preceding the current sample and estimated bit values $d_0$ through $d_n$ for the previous n samples, such that $$P_n = \text{Max}_{d_n = A} \left\{ \sum_{i=0}^{n} \left[ \frac{x_i(d_{i-1} + d_i)}{2} - \frac{(d_{i-1} + d_i)^2}{4} \right] \right\} ; \text{ and}$$

(b) a lower node path distance metric $N_n$ based on measured amplitudes $x_0$ through $x_n$ for a number n (where n is an integer representing a number of samples from a most recently decoded sample preceding the current sample) most recent samples preceding the current sample and estimated bit values $d_0$ through $d_n$ for the previous n samples, such that $$N_n = \text{Max}_{d_n = -A} \left\{ \sum_{i=0}^{n} \left[ \frac{x_i(d_{i-1} + d_i)}{2} - \frac{(d_{i-1} + d_i)^2}{4} \right] \right\}.$$

5. The method of claim 4 wherein the step of estimating further comprises determing the path difference metrics by determining:

(c) an upper node path difference metric $U_n$ based on the upper node path distance metric $P_n$, the lower node path distance metric $N_n$, the current sample value (where the current sample value is $X_{n+1}$), and a predetermined state amplitude value A, such that $U_n = P_n - N_{n+Xn+1} - A$; and (d) an lower node path difference metric $V_n$ based on the upper node path distance metric $P_n$, the lower node path distance metric $N_n$, the current sample value $X_{n+1}$, and the predetermined state amplitude value A, such that $V_n = P_n - N_n + x_{n+1} + A$.

6. The method of claim 5 wherein the step of estimating further comprises decoding the prior sample as estimated bit value $d_n$ where: (a) $d_n = A$ when $U_n \geq 0$; and (b) $d_n - A$ when $V_n < 0$.

7. A receiver comprising:
a demodulator operable for demodulating a received signal; and
a data detector, coupled to the demodulator, comprising:
a sampler and timing recovery detector means for sampling the signal and outputting a current sample amplitude value for a current sample; and
a decoder means for estimating a bit value of a prior sample to the current sample based on a sequence estimation of the first sample value by determining path distance metrics based on the first sample value and preceding sample values, determining path difference metrics based on the path distance metrics for each node, and decoding the prior sample based on the node difference metrics, wherein the decoder means is operable for determining the path distance metrics by determining:

(a) an upper node path distance metric based on measured amplitudes through for a number n of most recent samples preceding the current sample and estimated bit values for the previous n samples; and (b) a lower node path distance metric based on measured amplitudes for a number n of most recent samples preceding the current sample and estimated bit values for the previous n samples.

8. The receiver of claim 7 wherein:

the upper node path distance metric ($P_n$) is based on measured amplitudes $x_o$ through $x_n$ for a number n (where n is an integer representing a number of samples from a most recently decoded sample to the current sample) most recent samples preceding the current sample and estimated bit values $d_0$ through $d_n$ for the previous n samples, such that $$P_n = \text{Max}_{d_n = A} \left\{ \sum_{i=0}^{n} \left[ \frac{x_i(d_{i-1} + d_i)}{2} - \frac{(d_{i-1} + d_i)^2}{4} \right] \right\} ; \text{ and wherein}$$

the lower node path distance metric ($N_n$) is based on measured amplitudes $x_0$ through $x_n$ for a number n (where n is an integer representing a number of samples from a most recently decoded sample preceding the current sample) most recent samples preceding the current sample and estimated bit values $d_0$ through $d_n$ for the previous n samples, such that $$N_n = \text{Max}_{d_n = -A} \left\{ \sum_{i=0}^{n} \left[ \frac{x_i(d_{i-1} + d_i)}{2} - \frac{(d_{i-1} + d_i)^2}{4} \right] \right\}.$$

* * * * *